United States Patent [19]
Manley

[11] 4,437,018
[45] Mar. 13, 1984

[54] AUDIO COMPONENT COUPLER

[76] Inventor: Stephen C. Manley, 8 Bartlett St., Charlestown, Mass. 02129

[21] Appl. No.: 446,984

[22] Filed: Dec. 6, 1982

[51] Int. Cl.³ .............................................. H02J 1/00
[52] U.S. Cl. ........................................ 307/38; 307/86; 307/126; 307/140; 361/160; 340/825.25
[58] Field of Search ................ 307/38, 39, 86, 126, 307/140, 130; 340/644, 687, 825.25; 361/160, 187, 189

[56] References Cited

U.S. PATENT DOCUMENTS

| | | | |
|---|---|---|---|
| 4,054,802 | 10/1977 | Mock | 307/38 |
| 4,323,787 | 4/1982 | Sato et al. | 307/38 |
| 4,380,809 | 4/1983 | Sato | 307/38 X |

Primary Examiner—E. A. Goldberg
Assistant Examiner—Derek Jennings
Attorney, Agent, or Firm—Cesari and McKenna

[57] ABSTRACT

An audio component coupler connects to separate components in an audio system through their power terminals and integrates the components into a unified system in which the components are, at the selection of the user, responsive to either the automatic shut-off of a "master" component having internal automatic shut-off capability or to the operation of a slave component in a predetermined sequence. Control in either case is effectuated wholly from the components themselves and not from the coupler which may thus be placed remote from the components and even in a location not conveniently accessible to the user.

5 Claims, 5 Drawing Figures

AUDIO COMPONENT COUPLER

BACKGROUND OF THE INVENTION

A. Field of the Invention

The invention relates to audio systems and comprises a means of externally integrating separate components, preferably including one or more components having automatic shut-off capability.

B. Prior Art

Audio systems produce sound audible to the listener. In home-entertainment audio systems (colloquially referred to as "high-fi" or "stereo" systems), a number of distinct elements are commonly provided in order to accommodate different sound sources, as well as to optimize the performance of each of the elements. Thus, such systems currently typically include at least a record player and a tape deck, as well as an amplifier.

In "integrated" audio systems, these elements are incorporated in a common housing and have essentially fixed interconnections. In "discrete" or "component" systems, in contrast, the record player, tape deck, and amplifier typically constitute separate components, each having its own power supply, and each usually operable independently of the other. However, they are externally connectable by the user in certain configurations. For example, both the record player and the tape deck are connectable to the amplifier, and the latter, in turn, is connectable to one or more speakers.

Integrated audio systems frequently include an automatic shut-off feature whereby all components are turned off once one of the components, e.g., a record player or tape deck, reaches the end of its program material. This is a desirable feature, particularly for those to forget to turn off the system after the program material is completed, or who fall asleep before doing so. Nonetheless, this feature is not commonly available in component audio systems. At most, all that is commonly provided in such systems is a switched power outlet in one of the components, i.e., the amplifier, which can be used manually to turn off all components at the same time, but which is not responsive to the automatic cut-off of any component.

External control units for separate components heretofore have been provided, but such units typically require user action at the control unit itself. This restricts location of the control unit to a place that is easily accessible to the user.

BRIEF SUMMARY OF THE INVENTION

Objects of the Invention

Accordingly, it is an object of the invention to provide a means of inexpensively coupling separate audio components for common automatic shut-off without wiring changes to any of the components.

Further, it is an object of the invention to provide a means of inexpensively externally integrating separate audio components into a common automatic cut-off system.

Yet another object of the invention is to provide, in a component audio system, the common shut-off advantages of an integrated audio system.

Still another object of the invention is to provide a means of integrating separate audio components in a common shutoff system which is readily reconfigured by the user to again form a separate component system when desired.

Yet a further object of the invention is to provide a means of externally integrating separate audio components into a system controlled by one or more of such components.

BRIEF DESCRIPTION OF THE INVENTION

In accordance with the present invention, I provide an audio component coupler for externally integrating separate audio components into a system which is controlled by one or more of the components. Preferably the components include at least one component having automatic cutoff capability so that the components may be controlled by it.

The coupler comprises a housing having a main power connector and at least first and second component power connectors. A first power flow path extending between the main power connector and the first component power connector transfers power to a component connected to the connector, and includes a sensor providing an indication of the presence or absence of power flow to the component at any given time. A second power flow path between the main power connector and the second component power connector provides power to a second component connected to the corresponding power connector and includes a power interruption means that is coupled to the sensor and is controlled thereby. An audio component having an automatic cut-off capability (e.g., a record player or tape deck) is connectable to the first component power connector and, in the present invention, serves as a "master"; an audio component lacking such feature (e.g., an amplifier) is connected to the second power connector and serves as a "slave."

In the preferred embodiment of the invention, the power flow interrupter is normally de-energized in the absence of power flow to the master component. However, as soon as the master is turned "on", the flow of power to it is detected by the sensor in the first power flow path and the interruptor is energized to complete the second power flow path between the main terminal and the second component power connector, to thereby energize the slave. When the power flow to the master is again terminated, e.g., by automatic turn-off, the interrupter responds to cessation of current in the sensor to once again interrupt the power flow in the second flow path and thereby deenergize the slave component. Thus, the user can set the system to the automatic cut-off mode and then leave it without further attention, knowing that the automatic cut-off component will also cut-off another component such as an amplifier that is connected to the coupler. This is especially useful when the user wishes to fall asleep to music without bothering to turn off any components.

Sensors associated with the second power flow path monitor the status of this path and of the component connected to it. By switching one or more of the components to selected states, the user can determine which component will control power flow in the second path without physically accessing the coupler.

The coupler of the present invention is electrically connected to the respective audio components only through their power terminals, i.e., through their power cords, and thus no internal wiring changes whatsoever are required to operate the system. Accordingly, no technical competence of any kind is needed to convert separate, previously uncoupled components to an integrated, common shutoff system through use of the coupler described herein, and it therefore can quickly and easily be used by all. Further, because user access to the coupler is not required, the coupler may be installed at a location remote from the user (e.g., at a wall outlet) without inconvenience to the user.

DETAILED DESCRIPTION OF THE INVENTION

The foregoing and other and further objects and features of the invention will more readily be understood on reference to the following detailed description of the invention, when taken in conjunction with the accompanying drawings, in which.

Figure 1A:
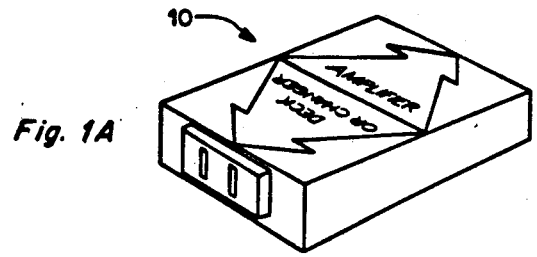
FIG. 1A is a view in perspective of a coupler constructed in accordance with the present invention.
Figure 1B:
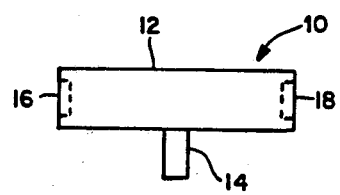
FIG. 1B is a vertical side view of the coupler of FIG. 1.
Figure 1C:
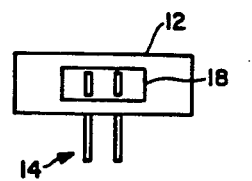
FIG. 1C is a vertical end view of the coupler of FIG. 1.
Figure 2:
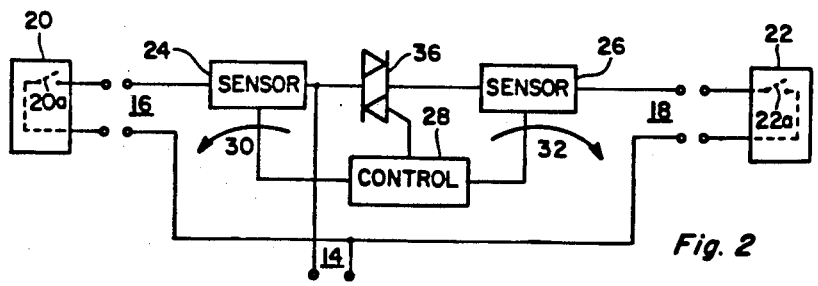
FIG. 2 is a block and line diagram of the coupler of the present invention.

In FIGS. 1 and 2, a housing 10, formed of a molded plastic material or the like, comprises a flat-generally rectangular casing 12 having a main power connector 14 and first and second component power connectors 16, 18, respectively. The connector 14 is adapted for insertion into a power socket (not shown) for receiving electric power. The connectors 16 and 18 receive the power plugs of master and slave components 20 and 22, respectively. In accordance with the present invention, component 20 advantageously comprises an audio component such as a tape deck or record player having an automatic cut-off switch shown as switch 20a in FIG. 2. Component 22 preferably comprises an audio component such as an amplifier which is to be operable in synchronism with component 20. It contains a conventional on-off switch manually operated by the user and indicated as 22a in FIG. 2.

A sensor 24 is located in a first power flow path 30 including component 20. Similarly, a sensor 26 is located in a second power flow path 32 including component 22. A control unit 28 responds to sensors 24 and 26 to control the conduction state of a triac 36. In particular, when both switches 20a and 22a are closed (i.e., the respective components are "on"), power is coupled from terminals 14 to terminals 16 to thereby complete the power loop 30. Sensor 24 senses the flow of current in the loop 30 and turns on triac 36 via control unit 28 to thereby complete the power flow loop 34. Power is then applied to terminals 18 from terminal 14 through triac 36.

When switch 20a opens (e.g., when the program material has been completed and the automatic shut-off feature is activated) the current flow in power loop 30 ceases. Sensor 24 responds to this by deenergizing triac 36 via control unit 28. Accordingly, the power flow through secondary power loop 34 is interrupted and component 22 is effectively turned "off."

The coupler of the present invention may also be operated to apply power to, and disconnect power from, component 22 independently of component 20. In particular, sensor 26 monitors conditions in power loop 32 and can itself control the power flow in this loop responsive to the opening and closing of switch 22a by the user. Thus, the system can be controlled from either the component 20 or the component 22, at the option of the user. Further, the control is effectuated from the components, and the user need not physically set or otherwise manipulate the coupler itself. Accordingly, the coupler may physically be located at a point removed from the components without inconvenience to the user.

Figure 3:
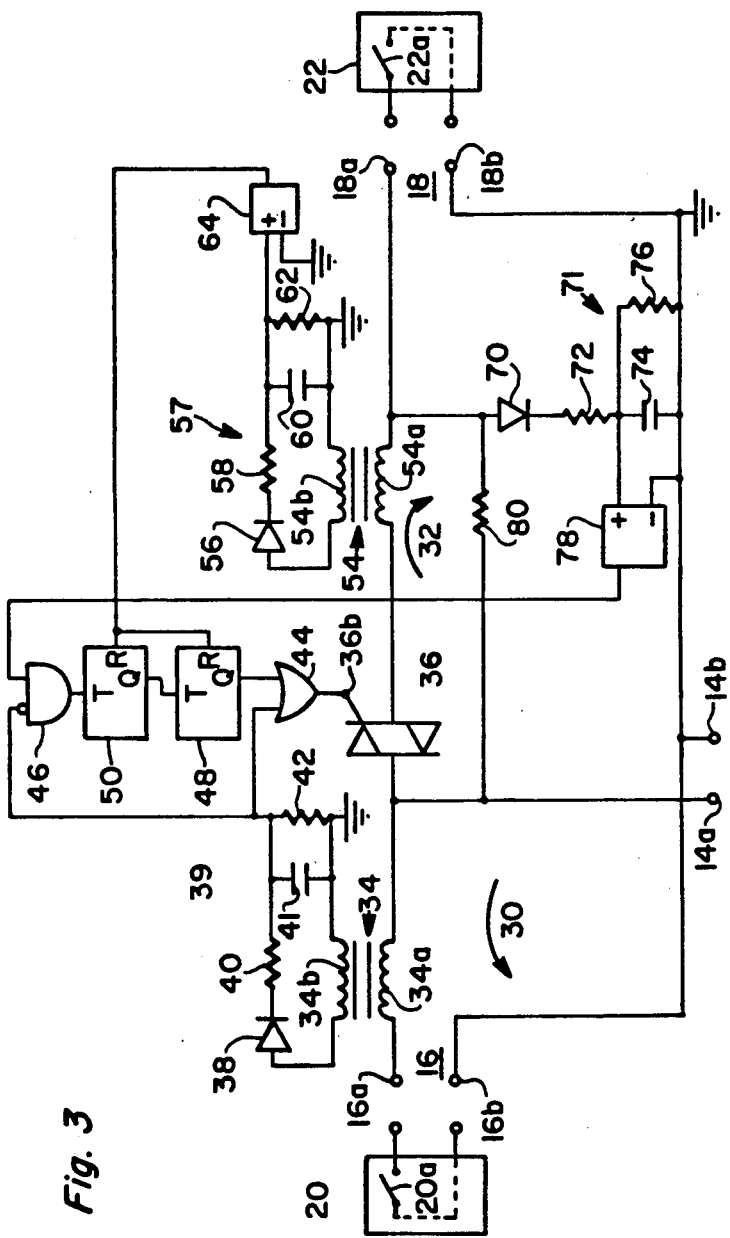
FIG. 3 is an electrical circuit diagram of a particular embodiment of the coupler of FIG. 2.

Turning now to FIG. 3, a circuit embodying the coupler of my invention is set forth in detail. Sensor 24 includes a transformer 34 having a primary winding 34a in a series loop with terminals 14 and 16 to form primary power loop 30. A secondary winding 34b of transformer 34 applies a sensor output signal to a rectifying diode 38 and a filter 39 comprising a resistor 40, a capacitor 41, and a bleeder resistor 42. The output of the filter is connected to drive a control gate 36b of triac 36 through control circuit 28 which includes an OR gate 44 and an AND gate 46 which also receives the output of the filter. OR gate 44 receives a second input from flip-flop 48 driven from a second flip-flop 50. Flip-flops 48 and 50 are negative-edge triggered "toggle-type" flip-flops. They are reset by a negative-going transition from a comparator 64 which provides a "high" level output as ong as its input is above a certain threshhold level and a "low" level output when the input is below the threshhold level. The flip-flop 50 responds to the transition from the high to the low level.

In like fashion, sensor 26 (FIG. 2) includes a transformer 54 having a primary winding 54a in series with terminals 14, triac 36 and terminals 18, thereby forming secondary power flow loop 32. Secondary winding 54b is in series with a rectifying diode 56 and a filter 57 comprising resistor 58, capacitor 60, and bleeder resistor 59 connected across capacitor 58. The output of the filter is applied to comparator 64.

A diode 70 is connected in series with a filter 71 comprising a resistor 72 and capacitor 74 between terminal 18a and ground. A bleeder resistor 76 is shunted aross capacitor 74 and a comparator 78, operating in the same manner as comparator 64, is connected to receive an input from capacitor 74. The output of the comparator is applied to gate 46. A resistor 80 interconnects terminals 14a and 18a. As will be understood more fully below, resistor 80 establishes the potential at terminal 18a in accordance with the setting of switch 22a in the absence of current in winding 54a.

The circuit shown in FIGS. 2 and 3 is operated by the user from the components themselves. Thus, once the coupler is plugged into a source of power and the components plugged into the appropriate terminals of the coupler, the user need not further concern himself with the coupler. The user can select either of two operating modes merely by activating the normal on-off switches of components connected to the coupler. In the first mode, the coupler is set to operate the component attached to terminals 18 (the "slave" component) in synchronism with the component attached to terminals 16 (the "master" component). Advantageously, the latter component is one having an automatic shut-off feature such as is found in a tape deck, record player, or the like. In this case, the component attached to terminals 18 is typically then an amplifier which is connected to receive the output of the component attached to terminals 16. In the second mode of operation, in contrast, the application of power to terminals 18 is controlled solely from the component attached to these terminals. This mode is useful, for example, when it is desired to operate an amplifier and an associated tuner or other component not using an automatic shut-off feature.

Both modes of operation start from an initial state in which the switches 20a and 22a of the components connected to terminals 16 and 18, respectively, are "off" or "open" and flip-flops 48 and 50 are reset. In this state, no current flows through primary winding 34a and triac gate 36b is therefore denenergized; accordingly, accordingly, no current flows through triac 36 or primary winding 54a of transformer 54. Terminal 18a is, however, at a "high" potential since it is connected to power terminal 14a through resistor 80. Capacitor 74 is thus charged and the output of comparator 78 is at a "high" level. Flip-flops 48 and 50 are reset, and control gate 36b receives no input from flip-flop 48. This is the quiescent or "home" state of the system.

When component 22 is switched "on", that is, when its switch 22a is closed, current begins to flow through this unit via resistor 80. The magnitude of this current is determined by the input impedance of component 22, and the value of resistor 80. The input impedance of component 22 is typically low (of the order of 100 ohms or so) and the magnitude of the current through the component can thus be limited to the order of a milliampere or so by selecting the value of resistor 80 to be of the order of 1000 ohms or so. This "trickle" current serves the purpose of dropping the voltage at terminal 18a to a relatively low value. This in turn drops the voltage on capacitor 74 to a low value, thereby causing the output of comparator 78 to drop to its "low" state. The resultant negative going pulse is coupled through gate 46 to flip flop 50 to set the output of this flip flop to a "high" state.

At this point, the user selects the mode in which the system is to operate. If the coupler is to operate in the "automatic" mode in which component 22 is controlled by the state of component 20, the user now closes switch 20a in component 20. This causes current to flow through primary winding 34a and thus through secondary winding 34b of transformer 34. Capacitor 41 is thereby charged and triac control gate 36b is therefore energized through OR gate 44. At the same time, the INHIBIT input of gate 46 is energized to block the passage of further control signals from comparator 78. When gate 36b is energized, it "fires" triac 36 to thereby connect power from terminals 14 to component 22 via terminals 18. Power remains applied to terminals 18 as long as switch 20a remains closed.

At the end of the program material, switch 20a is automatically opened. This cuts off current flow through transformer 34 and capacitor 41 is allowed to discharge. When it discharges sufficiently, it deenergizes control gate 36b and thus cuts off current through triac 36. At the same time, it releases the INHIBIT input to gate 46 so that signals from trigger 78 can again pass through this gate.

When the current through transformer 54 is terminated, capacitor 60 begins to discharge and, when it reaches a sufficiently low level, the output of comparator 64 falls. The resultant negative pulse is applied to flip-flops 48 and 50 to reset these flip flops. A small trickle current flows through resistor 80 as long as switch 22a is "on" or "closed", but the system is otherwise inactive. The system remains in this state until switch 22a is again opened. At that time, the trickle current through resistor 80 ceases and thus terminal 18a rises to a high potential and capacitor 74 charges. The system is thus ready to detect the next change in state at terminal 18a.

If, instead of placing the system under control of component 20, the user wishes to retain control from component 22, he or she may do so by actuating switch 22a of component 22 as was previously the case. This causes trickle current to flow through resistor 80 and drops the potential at terminal 18a. Capacitor 74 thus begins to discharge and, after it discharges to a predetermined value, comparator 78 applies a negative pulse through gate 46 to set flip flop 50 as was previously described. Now, however, the user again switches component 22 off, that is, opens on-off switch 22a. Terminal 18a again rises to a high potential and charges capacitor 74. The user then again turns component 22 on, that is, closes switch 22. This drops the potential at terminal 18a and causes capacitor 74 to discharge. The resultant negative going output from comparator 78 is again coupled through gate 46 to toggle flip-flop 50 to its Q state. This in turn toggles flip flop 48 to its Q or "high" state to thereby energize control gate 36b through OR gate 44. Triac 36 is thereby turned on and power is applied to terminals 18 from terminals 14 through triac 36. This power remains applied as long as switch 22a remains closed.

When it is desired to turn the system off, the user again opens switch 22a. This interrupts current flow through primary winding 54a of transformer 54 and capacitor 60 discharges. The output comparator 64 thereupon drops to a low level, thereby resetting flip flops 48 and 50. The energizing signal to control gate 36b is thereby cut-off, and triac 36 ceases to conduct current. The system is once again in its quiescent state.

From the foregoing it will be seen that I provided a simple, inexpensive coupler which can be used by persons without technical competence to quickly and easily couple together components into a unified system controlled by the automatic cut-off capability of any one of the components. The system requires no internal wiring changes in the components whatever, and thus is not only simple to use, but also avoids possible voidance of component warranties. It allows the user to select either the coupled or the uncoupled mode of operation easily and conveniently from a main component such as an amplifier.

It will be understood that changes may be made in various of the details of the illustrative example set forth herein, without departing from either the spirit or scope of the invention. Thus further power flow loops in parallel with loops 30 and 32 may be provided to accomodate a larger number of components, either as master or as slave. The specific circuitry that implements my invention may be modified by substituting different components performing essentially the same function. Or the coupler may be used with components connected solely to the secondary power transfer loops. Various other modifications will suggest themselves to those skilled in the art and it is intended that the foregoing be taken as illstrative only, and not in a limiting sense, the scope of the invention being defined with particularity in the claims.

What I claim:

1. An audio component coupler for externally integrating separate audio-visual components for coupled operation, comprising a housing having at least a main electrical power connector for receiving power from a power source, and first and second component electrical power connectors for supplying operating power to components separately connectable externally thereto; means defining a first power transfer path interconnecting said main electrical power connector and said first component power connector, said first path including sensing means providing an indication of the transfer of power along said path; and means defining a second power transfer path interconnecting said main electrical power connector and said second component power connector, said second path including power interruption means having switching means settable by the user to either of two independently selectable states in which the flow of power in the second path is responsive to the flow of power in said first path when set to said first state and is independent of the flow of power in the first path when set to said second state.

2. An audio component coupler according to claim 1 in which said sensing means comprises a current sensor.

3. An audio component coupler according to claim 1 in which said sensing means comprises a transformer having a primary winding in series with said first power transfer path for sensing the flow of current therein, and a secondary winding magnetically coupled to said primary winding and providing an electrical output indicative of the current in said primary winding.

4. An audio component coupler according to claim 3 in which said switching means includes a triac coupled to the output of said secondary winding and operable to control the flow of power in said second power transfer path.

5. An audio component coupler for externally integrating separate audio-visual components for coupled operation, comprising a housing having at least a main electrical power connector for receiving power from a power source and at least first and second component electrical power connectors for supplying operating power to components connectable externally thereto, at least one of which is a switched component having a user-operable on-off switch for controlling the application of power thereto; means defining a power transfer path interconnecting said main electrical power connector and said component power connector, said path including current means providing an indication of the transfer of power along said path; voltage establishing means for establishing the voltage of a selected point in the power transfer path in accordance with the setting of said on-off switch; voltage sensing means for sensing the voltage at said selected point, and means responsive to both said voltage and said current sensors for completing said power transfer path on cycling of said on-off switch by the user through a predefined sequence of states including at least a first state in which the flow of power through said transfer path to said switched component is dependent on the flow of power through a separate component connected to said main power connector, and a second state in which the flow of power through said transfer path to said component is independent of the flow of power through other components.

* * * * *